United States Patent
Koga et al.

(10) Patent No.: US 7,653,458 B2
(45) Date of Patent: Jan. 26, 2010

(54) ROBOT DEVICE, MOVEMENT METHOD OF ROBOT DEVICE, AND PROGRAM

(75) Inventors: Toshiyuki Koga, Tokyo (JP); Yasuhiko Suzuki, Tokyo (JP); Takashi Yoshimi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 860 days.

(21) Appl. No.: 11/265,200

(22) Filed: Nov. 3, 2005

(65) Prior Publication Data

US 2006/0217837 A1     Sep. 28, 2006

(30) Foreign Application Priority Data

Mar. 23, 2005 (JP) ............................ P2005-083614

(51) Int. Cl.
*G06F 19/00* (2006.01)
(52) U.S. Cl. ..................................... 700/245
(58) Field of Classification Search ................. 700/245, 700/257, 259
See application file for complete search history.

(56) References Cited

FOREIGN PATENT DOCUMENTS

| | | |
|---|---|---|
| JP | 2001-188555 | 7/2001 |
| JP | 2002-189519 | 7/2002 |
| JP | 2003-340764 | 12/2003 |
| JP | 2004-78333 | 3/2004 |
| JP | 2004-126800 | 4/2004 |

OTHER PUBLICATIONS

Notification of Reason for Refusal issued by the Japanese Patent Office on Jul. 7, 2008, for Japanese Patent Application No. 2005-083614, and English-language translation thereof.

*Primary Examiner*—Kim T Nguyen
(74) *Attorney, Agent, or Firm*—Finnegan, Henderson, Farabow, Garrett & Dunner, L.L.P.

(57) ABSTRACT

A robot device, which autonomously performs actions, includes a moving unit that moves the robot device, and a target position acquiring unit that acquires position information of a target. A movement method judging unit receives an instruction for a movement from a user, and judges whether or not a destination can be designated by fixed position information. When it is judged that the destination can be designated by the fixed position information, control is performed by a position movement control unit. When it is judged that the destination cannot be designated by the fixed position information, control is performed by a target movement control unit, which acquires position information from the target position acquiring unit, to operate the moving unit.

11 Claims, 8 Drawing Sheets

ROBOT DEVICE, MOVEMENT METHOD OF ROBOT DEVICE, AND PROGRAM

CROSS-REFERENCE TO RELATED APPLICATIONS

This application is based upon and claims the benefit of priority from the prior Japanese Patent Application No. 2005-83614, filed Mar. 23, 2005, the entire contents of which are incorporated herein by reference.

BACKGROUND

1. Field of the Invention

The present invention relates to a robot device that moves according to a move request from a user, a movement method of a robot device, and a program.

2. Description of the Related Art

In the related art of industrial robots, there has been an operation method in which tracking control is performed on a target whose position is not clearly determined, and then going back to an initial position are programmed to be repeatedly performed so as to operate the robot.

Further, as for automatic traveling of a vehicle, there has been an operation method of switching two traveling (movement) manners in which the vehicle travels along a prearranged path usually and, when a possibility that the vehicle encounters an obstacle is presumed and found to be high, the vehicle travels on the basis of a traveling trajectory path, which follows a preceding vehicle through sensing by use of a camera (for example, JP-A-2004-78333).

Regarding automatic traveling of the vehicle described above, during travel along the prearranged path, switching to travel along the traveled trajectory path can be performed, but, when automatic traveling of the vehicle is applied to the robot device, it is only during an emergency that switching by an interrupt is performed.

What is needed are movement methods that provide improved moving means for a robot device. Such movement methods can include a movement method to a fixed destination and a movement method for tracing a moving target.

SUMMARY

According to some embodiments of the present invention, there is provided a robot device, which autonomously performs actions, comprising a moving unit that moves the robot device; a target position acquiring unit that acquires position information of a target; a first movement control unit that designates a destination by fixed position information and controls the moving unit to move from current position information thereof to the designated position information; a second movement control unit that designates the destination by a target and, when the position information of the target is obtained from the target position information acquiring unit, controls the moving unit to move towards the obtained position information of the target; an instruction input unit to input an instruction, from a user, corresponding to the movement; and a judging unit that judges whether the instruction inputted by the instruction input unit can designate the destination as the fixed position information, gives the destination to the first movement control unit when it is judged that the instruction for the movement can designate the destination as the fixed position information, and gives the destination of the target to the second movement control unit when it is judged that the instruction for the movement cannot designate the destination as the fixed position information.

According to some embodiments of the present invention, there is provided a robot device, which autonomously performs actions, comprising a moving unit that moves the robot device; a first movement control unit that designates a destination by fixed position information and controls the moving unit to move from current position information of the robot device to the designated position information; a second movement control unit that designates the destination by a target and controls the moving unit to move towards the target; an instruction input unit to input an instruction, from a user, corresponding to the movement; and a judging unit that gives the destination to the first movement control unit when the instruction for the movement inputted by the instruction input unit can designate the destination by the fixed position information, and gives the destination of the target to the second movement control unit when the target is a moving target.

According to some embodiments of the present invention, there is provided a movement method of a robot device, which autonomously performs actions, the robot device having a moving unit that moves the robot device, a target position information acquiring unit that acquires position information of a designated target, a first movement control unit that designates a destination by fixed position information and controls the moving unit to move from current position information of the robot device to the designated position information, and a second movement control unit that designates the destination by the target and, when the position information of the target is obtained from the target position information acquiring unit, controls the moving unit to move toward the obtained position information of the target, the movement method comprises inputting an instruction, from a user, corresponding to the movement; and judging whether the instruction inputted through the instruction input unit can designate the destination as a fixed position information, giving the destination to the first movement control unit when it is judged that the instruction can designate the destination as the fixed position, and giving the destination to the second movement control unit when it is judged that the instruction cannot designate the destination by the fixed position information.

According to some embodiments of the present invention, there is provided a program being executed on a robot device, which autonomously performs actions, the robot device having a moving unit that moves the robot device, and a target position information acquiring unit that periodically acquires position information of a target, the program comprises a first program code that designates a destination by fixed position information and controls the moving unit to move from current position information of the robot device to the designated position information; a second program code that designates the destination by the target and, when the position information of the target is obtained from the target position information acquiring unit, controls the moving unit to move towards the obtained position information of the target; a third program code that receives an instruction from a user corresponding to the movement; and a fourth program code that judges whether the instruction received through the execution of the third program code can designate the destination by the fixed position information, gives the destination to the first program code when it is judged that the instruction can designate the destination as the fixed position information, and gives the destination of the target to the second program code when it is judged that the instruction cannot designate the destination by the fixed position information.

DETAILED DESCRIPTION

Figure 1:
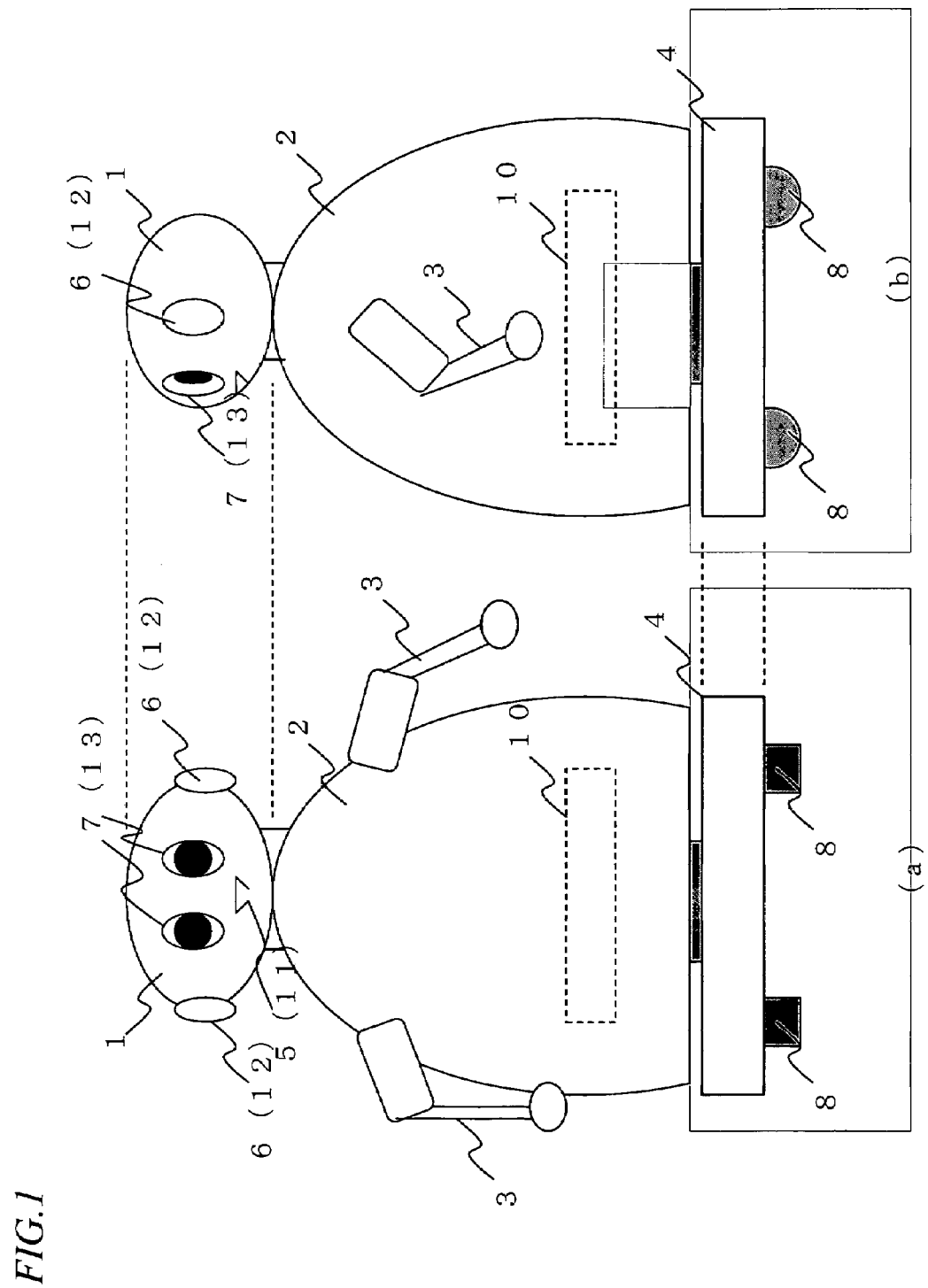
FIG. 1A is a front-view of an exemplary robot device.
FIG. 1B is a side-view of an exemplary robot device.

FIGS. 1A and 1B illustrate the appearance of a robot device according to some embodiments. FIG. 1A is a front-view diagram, and FIG. 1B is a side-view diagram. In some embodiments, such as shown in FIGS. 1A and 1B, the robot device of the present embodiment has a shape similar to a human.

A head portion 1, which includes a neck, has a mouth portion 5 including a speaker 11 for outputting an audio signal, two ear portions 6, each including microphones 12 for inputting an audio signal, and two eye portions 7, each including a camera 13 for inputting an external video. Each of arm portions 3 may include a hand and some joints, and performs actions corresponding to the arm and hand of a human being.

A moving unit 4 has four tires 8, which allows the robot device to move straight ahead/back or turn left and right on a floor. That is, the moving unit 4 functionally corresponds to the legs of a human being.

A body portion 2 is a central part of the robot device, and connects to the head portion 1 (via the neck), arm portions 3, and moving unit 4 through rotation mechanisms. Further, a robot system 10 is incorporated within the body portion 2. The robot system 10 manages the overall control of the actions of the robot device and/or information processing.

In some embodiments, the moving unit 4 is implemented by rotating the four tires 8, but the invention is not limited thereto. For example, the moving unit 4 may be implemented by rotating two, three, or five or more tires. Further, the moving unit 4 may be implemented to be driven by two caterpillars. In addition, the moving unit 4 may be implemented by two legs, each having a plurality of joints, such that the robot device performs two-legged walking. Further, in some embodiments, the robot device has a shape similar to that of a human being, but the shape is not particularly limited. For example, the arm portions may be removed, and the robot device may include one eye portion or three or more eye portions, and a keyboard or a screen.

Figure 2:
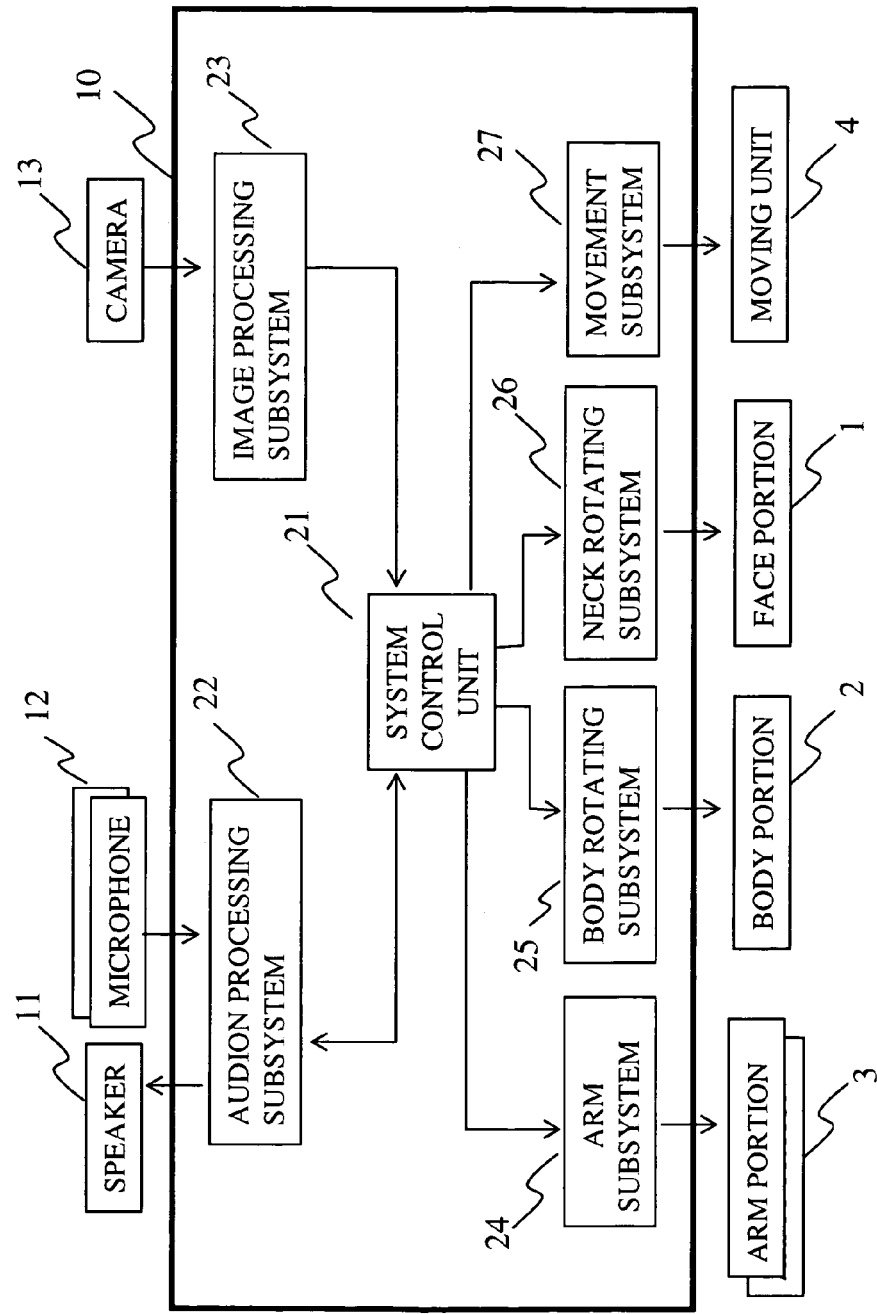
FIG. 2 is a block diagram illustrating an exemplary system configuration of a robot device.

FIG. 2 is a block diagram illustrating an exemplary robot system configuration of a robot device. A robot system 10 is broadly divided into a system control unit 21 that processes and determines actions of the robot device, and various subsystems 22-27 that receive input information (hereinafter, referred to as control input information) that is transmitted to the system control unit 21 for processing and determining the action of the robot device, and/or receive and execute instruction information (hereinafter, referred to as control output information) regarding the action determined by the system control unit 21.

Audio processing subsystem 22 is a device that performs the audio processing, such as A/D conversions or D/A conversions, voice recognition, audio synthesis, and the like. The audio processing subsystem 22 supplies the control input information, such as an audio signal inputted through the microphone 12, to the system control unit 21. In some embodiments, the audio processing subsystem 22 receives signals from the system control unit 21 and processes these signals so that speaker 11 provides a "voice" for the robot device. Further, for example, when voice recognition does not recognize the input voice command, the audio processing subsystem 22 may automatically request through audio synthesis to repeat the voice command. In some embodiments, the audio synthesis can be processed in the voice processing subsystem 22 in a closed-loop manner, and not through the system control unit 21.

Image processing subsystem 23 is a device that performs image recognition on an image inputted from camera 13, and supplies control input information, to the system control unit 21. Further, the image processing subsystem 23 can perform distance measurements of a target subject by using a triangulation method via two cameras 13. In addition, the image processing subsystem 23 has a tracking function which repeatedly performs image-capturing and controls the directions of the cameras 13 to always cause the cameras 13 to follow the target subject.

Arm subsystem 24 receives control output information from the system control unit 21, determines a physical drive amount of an individual joint of each of the arm portions 3, and operates the arm portions 3. The body rotating subsystem 25 receives the control output information from the system control unit 21, determines a physical rotation amount of the body portion 2 with respect to the moving unit 4, and rotates the body portion 2. The neck rotating subsystem 26 receives the control output information from the system control unit 21, determines a physical rotation drive amount of the head portion 1 (the neck) with respect to the body portion 2, and rotates the head portion 1 (via the neck). The movement subsystem 27 receives the control output information from the system control unit 21, determines a rotation amount of each of the tires 8 (if the target subject is straight ahead, the rotation amount may be simply determined), and rotates the individual tires 8. Moreover, by adjusting the rotation amount in a predetermined time, a speed can be adjusted.

System control unit 21 determines the actions of the robot device. The system control unit 21 receives an external situation or an internal state (for example, a posture of the robot device, a residual quantity of a battery, or the like) as the control input information, processes and determines one or more actions according to a prescribed rule, for example, and outputs the control output information to one or more subsystems, which can perform the action. Further, a static processing, such as a calculation, maybe performed by the system control unit 21.

Moreover, in some embodiments, all subsystems 22-27 pass control input information through to system control unit 21, but the subsystems 22-27 may communicate data directly with one another. In some embodiments, each of the system control unit 21 and the subsystems 22-27 has at least a processor and a volatile memory. Further, in some embodiments, system control unit 21 and subsystems 22-27 may include a non-volatile memory.

Moreover, the robot device of the present embodiment has the above-described subsystems 22-27, but the invention is not limited to this configuration. For example, in the case where a robot device has wireless capabilities, additional devices may be provided. For example, additional devices may be a display function or the like, various subsystems such as a wireless subsystem that performs a wireless communication processing, a display subsystem that allows an additional display device to be attached and performs a display control, a tablet subsystem that is associated with the display subsystem and an input or the like is performed when a user touches, and the like.

Figure 3:
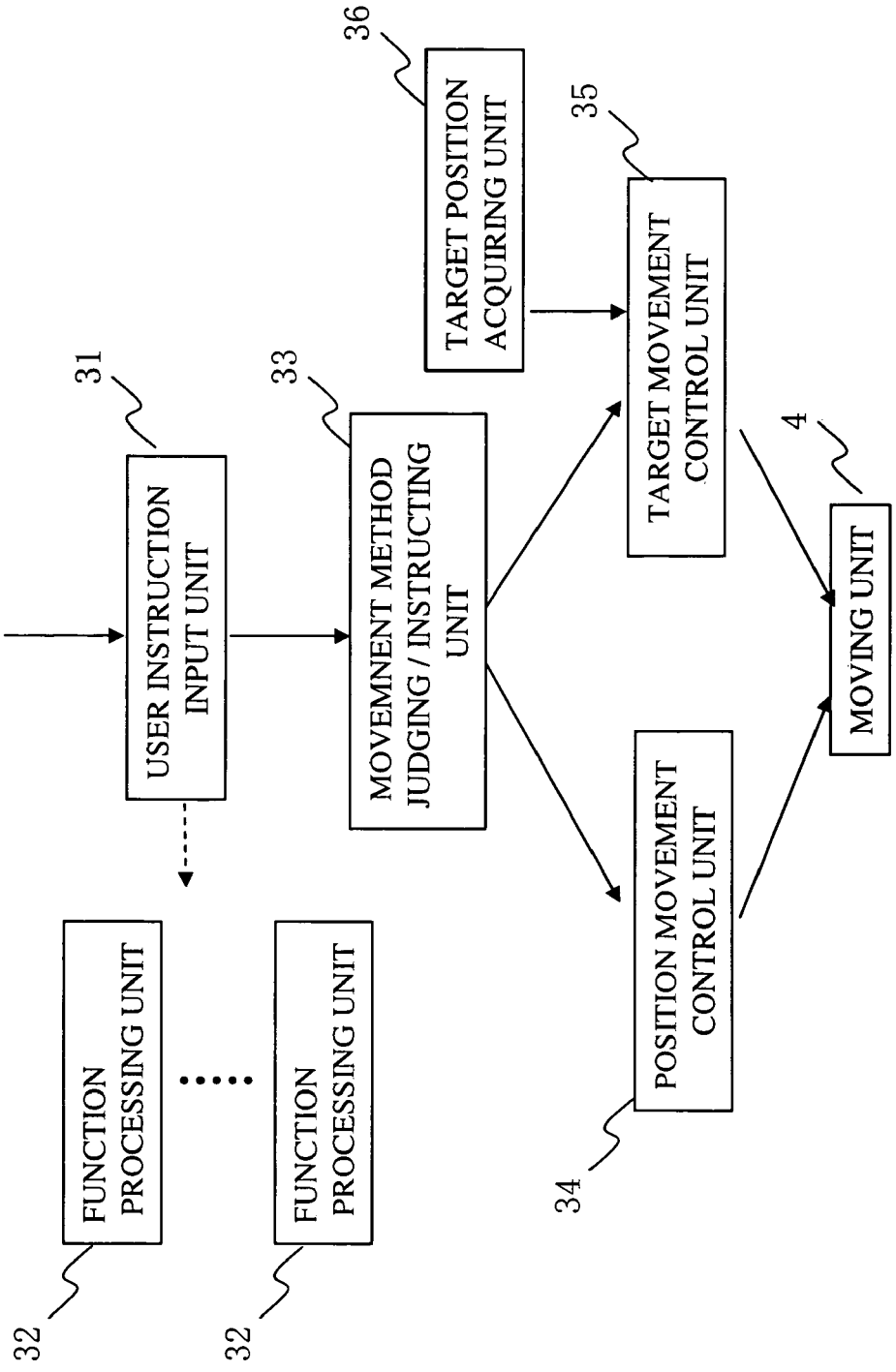
FIG. 3 is a block diagram illustrating a process for movement control of the robot device.

FIG. 3 is a block diagram illustrating a process for movement control of the robot device. The user requests the robot device to perform any action by an input method, such as a voice command, the selection of a button on a tablet or remote control, the description of characters, a gesture, or the like. The user request is inputted to a user instruction input unit 31 through the input device, such as a microphone, a tablet, a camera, or the like.

The user instruction input unit 31 recognizes/analyzes the input request of the user according to the input method, and generates one or more tasks for implementing the action of the robot device to meet the request of the user.

The task described herein indicates a command which is directly instructed on one of a position movement control unit 34, a target movement control unit 35, and one or more individual function processing units 32, all of which are described below. Moreover, when a plurality of tasks are generated and an execution sequence among the tasks exists, information indicating the execution sequence is generated in the individual tasks or separately from the tasks. Then, when the generated task indicates a movement of the robot device, the user instruction input unit 31 supplies the generated task to a movement method judging/instructing unit 33. Moreover, the task indicating the movement includes at least the target name of the destination. On the other hand, when the generated task does not indicate a movement of the robot device, the user instruction input unit 31 supplies the generated task to one or more individual function processing units 32.

Here, an example of the user instruction input unit 31 will be described with reference to FIG. 4.

A user instruction converting unit 41 recognizes and analyzes the input request of the user according to the input method to convert the request of the user into a prescribed internal data format, and then outputs the conversion result. Hereinafter, the conversion result is referred to as a user command.

Here, for example, where the user input is a voice command, the user instruction converting unit 41 converts an analog signal inputted from the microphone 12 into a digital signal, performs voice recognition, semantic analysis, and the like, and outputs the user command. Further, for example, where the user selects a button on a tablet, the user instruction converting unit 41 outputs the user command corresponding to the selected button. Further, where the user input is a description represented by characters, the user instruction converting unit 41 performs character recognition, semantic analysis, and the like, and outputs the user command. Further, for example, where the user input is a gesture, the user instruction converting unit 41 performs feature extractions, motion extractions, semantic analysis processing for the motion, and the like from images successively provided by the camera 13, and outputs the user command.

Figure 5:
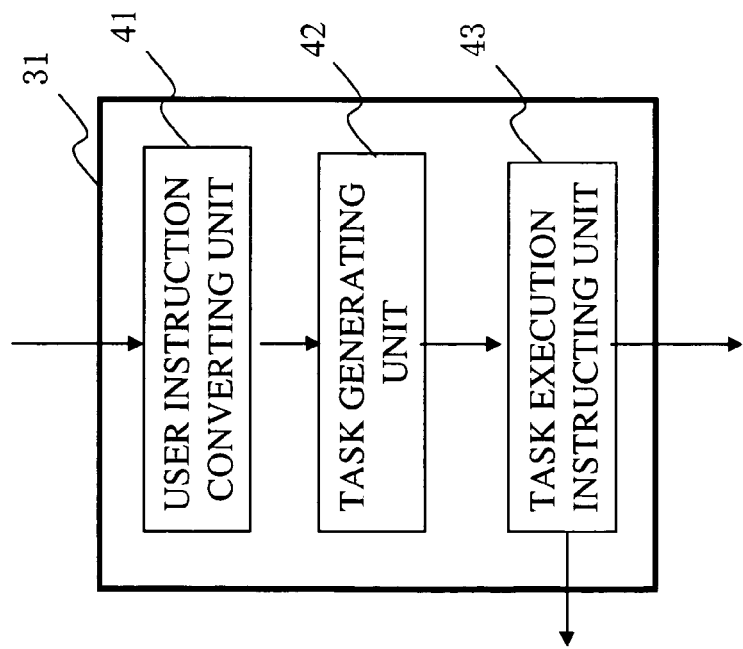
FIG. 5 is a block diagram illustrating an exemplary user instruction converting unit.

Here, as an example of the user instruction input unit 41, a case in which the request for the robot device to perform is carried out by voice command will be described with reference to FIG. 5.

The request from the user is inputted through the microphone 12 as a voice command. An A/D converting unit 51 converts an input analog signal corresponding to the voice command into a digital signal, and the converted digital signal is inputted to a voice recognizing unit 52.

The voice recognizing unit 52 recognizes the input digital signal by use of a voice recognition dictionary 53, and outputs text data as the voice recognition result.

A semantic analyzing unit 54 analyzes the semantic of the input text data by use of a semantic analysis dictionary 55, and generates and outputs the user command according to the prescribed internal data format on the basis of the analysis result. For example, for a simple request of the user, such as 'GO TO KITCHEN', 'TAKE REMOTE CONTROL DEVICE', or the like, the above-described semantic analysis does not need to be particularly performed, but when the user's request needs understanding of a sentence, for example, 'RETURN (TO ORIGINAL PLACE' or 'KEEP WATCHING MR. A', semantic analysis in terms of the intention of the user needs to be performed. Accordingly, by providing the semantic analyzing unit 54, various requests of the user can be accepted. Further, as an example of the internal data format, herein, data of a format of 'predicate:object(: preposition)' is outputted. For example, when the input by the voice command of the user is 'GO TO KITCHEN', data of a format of 'go:kitchen:to' is outputted.

Moreover, in some embodiments, if the voice command vocabulary is restricted (that is, if only a prescribed simple command, not a complex context, is handled), the semantic analyzing unit 54 and the semantic analysis dictionary 55 may not be needed. In this case, instead of the voice recognition dictionary 53, a voice recognition-user command correlation dictionary, in which the voice input and the user command are correlated with each other, may be provided.

Figure 4:
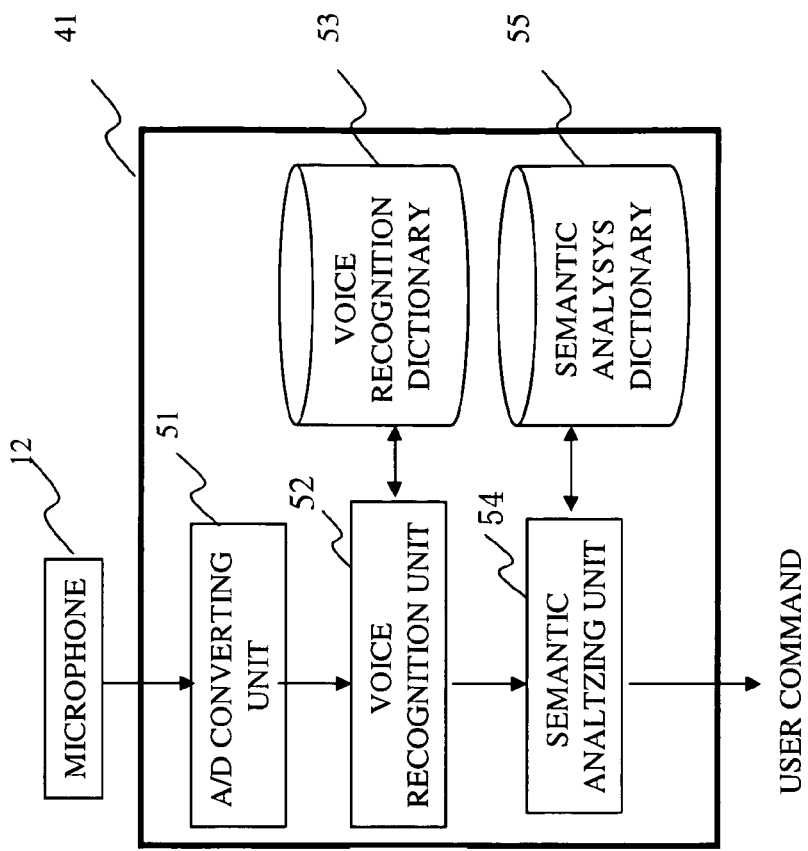
FIG. 4 is a block diagram illustrating an exemplary user instruction input unit.

Returning to the description of FIG. 4, a task generating unit 42 receives the user command outputted from the user instruction converting unit 41, determines the action of the robot device for solving the user command corresponding to the user command, and generates one or more tasks as an instruction for implementing the action. Moreover, when a plurality of tasks are generated, the execution sequence (including parallel execution) and the like are defined.

Here, an example in which the task generating unit 42 generates the task from the user command will be described. When the voice command of 'TAKE BEER' is spoken by the user, the robot device needs to perform a series of tasks, that is, a task for going from a current position to a refrigerator, a task for opening the refrigerator, a task for finding a beer, a task for holding the beer, a task for closing the refrigerator, and a task for moving near the user, in that order. Accordingly, the task generating unit 42 generates these tasks, and defines the tasks to be executed in that order. The example above describes in words the individual tasks, but, actually, the individual tasks are represented in a format capable of being executed by one of the position movement control unit 34, the target movement control unit 35, and the one or more individual function processing units 32, all of which are described below.

Further, the task generating unit 42 generates tasks considering the external situations (for example, there is an obstacle, it is dark, it is hot, or the like) or internal states (for example, which direction the robot device faces, if the robot device is holding up a right arm, whether the robot device is uttering, or the like). The same is applied to the present embodiment.

Next, when a task execution instructing unit 43 receives non-movement tasks from the task generating movement 42, the task execution instructing unit 43 supplies the non-movement tasks to the one or more function processing units 32 and instructs the one or more function processing units 32 to execute the tasks. On the other hand, when the task execution instruction unit 43 receives movement tasks generated by the task generating unit 42, the task execution instructing unit 43 supplies the movement task to the movement method judging/instructing unit 33. For example, the task execution instructing unit 43 has a table (not shown) in which the tasks and individual function processing units for processing the tasks, or the name (identifier) of the movement method judging/instructing unit 33, described later, are correlated to each other.

In such a manner, an example of the user instruction input unit 31 can be implemented.

Returning to FIG. 3, the one or more function processing units 32 respectively execute the individual functions, for example, such as driving of the arm, speaking, and the like.

The movement method judging/instructing unit 33 receives the task from the user instruction input unit 31, and judges whether or not the task indicates a movement to a fixed destination. In this case, the judgment can be implemented, for example, as follows:

A list stores registered fixed targets within a movable region of the robot device, and it is judged whether or not a name corresponding to a destination target included in the task is present in the list.

When the input is performed by the user through a tablet, the movable region of the robot device and the target in that region are displayed on the tablet, and the movement to the target is instructed at the time of the selection of the target, whether or not the target is a registered fixed object, and it is judged whether or not the instructed target is the fixed object.

Further, only when the destination is the fixed target at the time of the input of the user, information indicating that purport is added and inputted. Then, when the information is detected at the time of the analysis, it may be judged that the target is moving. This may be implemented by voice command, such as 'MOVE TO FIXED OBJECT XX (XX=the name of the target)' and/or by pressing a button on a tablet for specifying 'FIXED TARGET', prior to designating the target.

Here, as described above, it is assumed that the list in which the fixed target in the movable region of the robot device is registered in advance is provided, and it can be judged whether the name corresponding to the destination target included in the task is present in the list. Hereinafter, this example will be described in detail.

Figure 6:
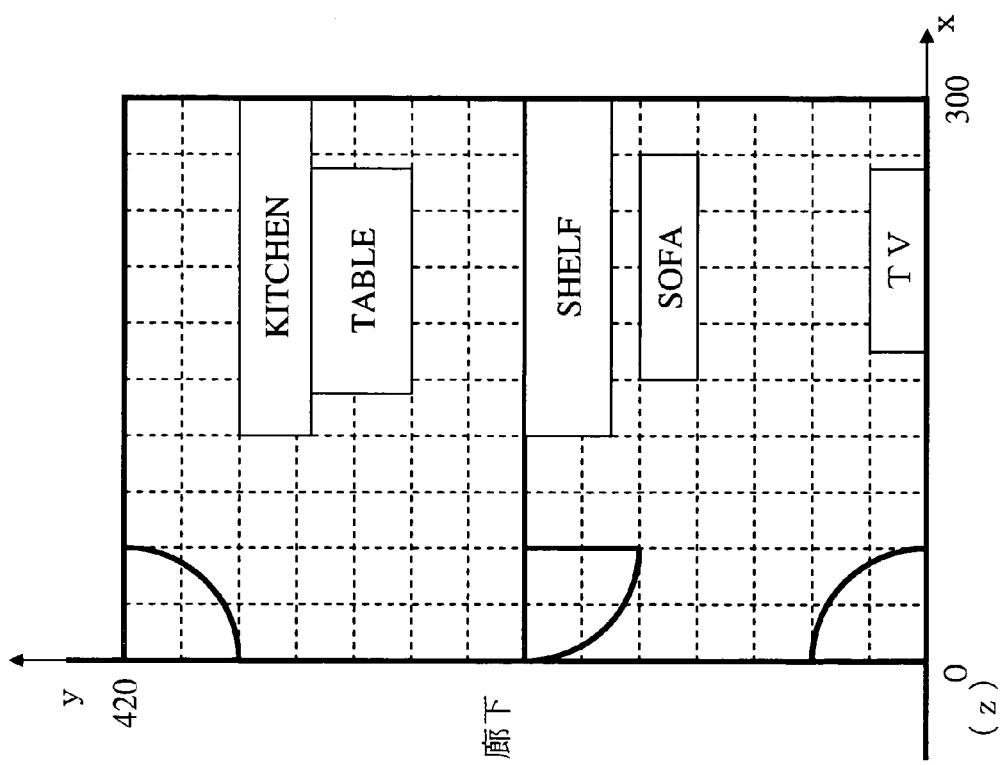
FIG. 6 illustrates exemplary map information that a robot device uses to determine its movement to a target location.

FIG. 6 illustrates exemplary map information that a robot device uses to determine its movement to a target location. The map information includes objects (hereinafter, referred to as fixed objects), which are fixed and whose positions are determined. The individual fixed objects have identification information, such as a name or code for identification, and position information. For example, the position information can include map coordinate values in a map coordinate system of the fixed objects or dimensional values of the sizes of the objects are imparted (not shown). Moreover, the objects are shown in forms of images, but may be a list.

First, when the task (of the movement) is inputted, the movement method judging/instructing unit 33 searches where the target, included in that task, is disposed on the map information, and, when the position of the target is found out, obtains the position information. For example, for the task indicating "GO TO KITCHEN", the target becomes "KITCHEN", and thus "KITCHEN" is located from the map information. Since "KITCHEN" exists in the map information shown in FIG. 6, the movement method judging/instructing unit 33 judges that the task indicates a movement to the fixed destination. Further, the position information of "KITCHEN" is obtained. Moreover, the position information may be one point in the vicinity of the kitchen.

On the other hand, when the target does not exist anywhere on the map, the movement method judging/instructing unit 33 judges that the target is not a fixed object. For example, in case of the task indicating "FOLLOW MR. A", the target becomes "MR. A", and "MR. A" is located from the map information. However, since "MR. A" is not an object whose position is clearly determined, "MR. A" does not exist in the map information. For this reason, the movement method judging/instructing unit 33 judges that the task does not indicate movement to a fixed destination.

Hereinafter, the movement to a fixed destination (or object) is referred to as position movement. Further, the movement not to a fixed destination (or object) is referred to as target movement.

Returning to FIG. 3, the movement method judging/instructing unit 33 supplies the task to the position movement control unit 34 when it judges the movement to be a position movement, and supplies the task to the target movement control unit 35 when it judges the movement to be a target movement.

The position movement control unit 34 receives the position information obtained by the movement method judging/instructing unit 33, specifies the position of the fixed destination, and generates movement path information in which pass points for moving to that position, the sequence, and the like are defined. Once it is generated, the movement path information is not changed unless a special situation, such as movement interruption or the like, occurs. The position movement control unit 34 successively supplies the rotation speed of the tire 8 or the like to the moving unit 4 on the basis of the generated movement path information, and guides the robot device to the target position. The position movement control unit 34 performs a sequence control in which the path is generated first, and then the movement is performed according to the generated path.

Figure 7:
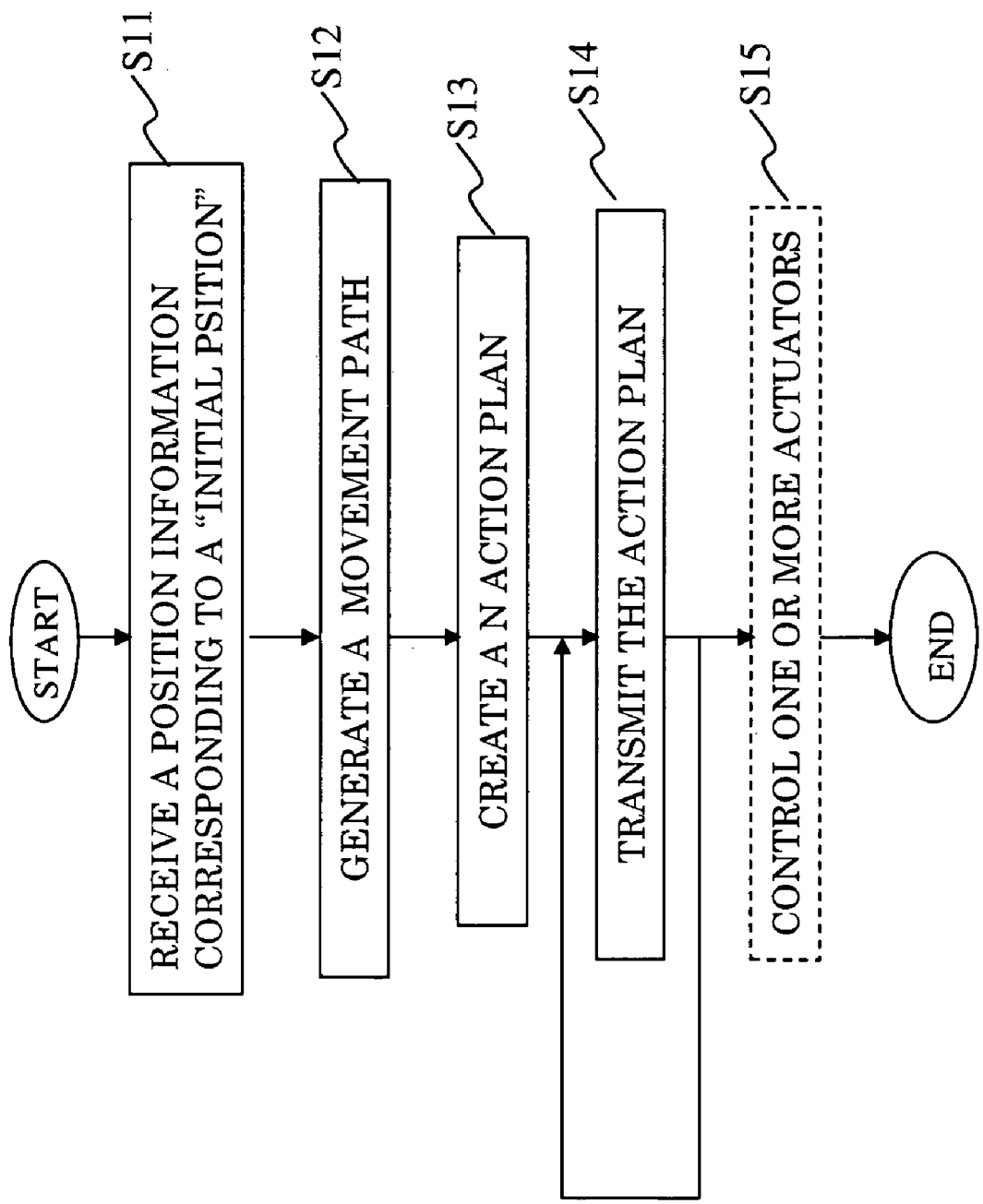
FIG. 7 is a flowchart illustrating a method for moving to a prescribed initial position according to position movement control unit.

Here, an example of a movement for going back to a determined initial position by the position movement control unit 34 will be described by way of a flowchart in FIG. 7.

The position movement control unit 34 receives the position information corresponding to an "initial position" acquired by the movement method judging/instructing unit 33 (S11). The position movement control unit 34 generates a movement path having the current position information of the robot device, which is internal information of the robot device, as a start point and the input position information of the "initial position" as an end point by use of the map information (S12).

As for the generation of the movement path, first, the position information of the fixed object included in the map information is referred to, and then the path is corrected so as to avoid a fixed object, which becomes an obstacle of the path. After the path is generated, the path is divided into simple basic shapes, such as a line segment, an arc, and the like, and the division points are added on the path as the pass points. A path from one pass point to a next pass point is referred to as a division path. Then, the division paths are incorporated so as to generate the movement path. Moreover, the current position information of the robot device may be acquired by constantly performing dead-reckoning during moving, or further, by a self-position detection function using a well-known marker. Further, during the actual movement, the position information of the robot device is corrected using the self-position detection function, and the movement path is corrected, so the probability of the arrival at the end point is increased.

Next, the position movement control unit 34 creates an action plan by generating a series of speed values or a series of acceleration values from the start point to the end point at the time of the movement in the individual division paths of the generated movement path (S13). As a policy for creating the action plan, for example, a policy on the preferential basis of a secure movement or a policy on the preferential basis of a movement in a short time can be exemplified. Then, a method of creating a specified action plan is determined on the basis of the policy. For example, in some embodiments, when the division path is an arc shape, the movement is performed at low speed, and, when the division path is a linear shape, the movement is performed at high speed. The speed value may change when the division path is switched from the arc shape to the linear shape at the time of passing through the pass point, but the action plan is created such that the speed value is set so as to smoothly change.

The position movement control unit 34 successively transmits the action plan corresponding to the division path to the moving unit 4 (S14).

In such a manner, if the action plan is successively transmitted, the moving unit 4 controls one or more actuators on the basis of the successively transmitted action plan (S15). For example, when the moving units 4 has wheels, the moving unit may have stepping motors/motor drivers that are connected to drive the wheels. The moving unit 4 performs a control loop for acquiring the speed values from the action plan, converting the speed values into signal values for the stepping motors, and outputting the signal values from the motor drivers to the stepping motors.

Returning to the description of FIG. 3, when the position information is not obtained by the movement method judging/instructing unit 33, the target movement control unit 35 receives the target, and specifies the target by use of a target position acquiring unit 36.

The target position acquiring unit 36 acquires image information by use of an image sensor, such as a camera or the like, detects the target from the image information, and calculates the position information of the destination from information, such as the position, direction, or the like of the target. Further, when the target constantly produces sound, the target position acquiring unit 36 acquires sound-source information by use of a sound-source sensor that constantly detects the direction of sound, detects the target from the sound-source information, and calculates the position information of the target from information, such as the position, direction, or the like of the target. Further, when the target has a directional wireless tag, the direction of the tag may be acquired, and the distance may be determined according to wireless intensity or the like. In some embodiments, the target position acquiring unit 36 preferably acquires correct position information, but the invention is not necessarily limited thereto.

Figure 8:
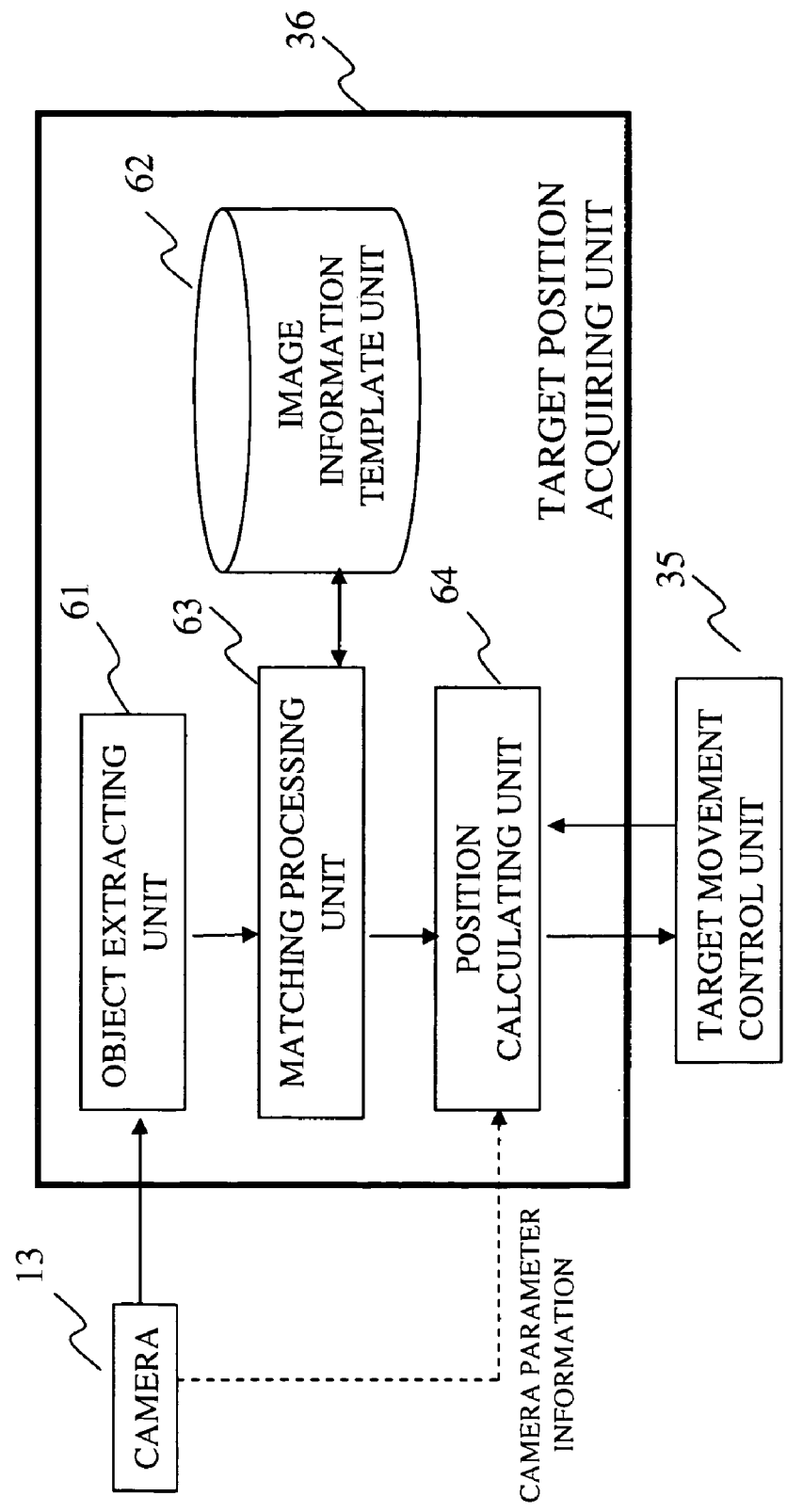
FIG. 8 is a block diagram illustrating an exemplary target position acquiring unit.

FIG. 8 is a block diagram illustrating an exemplary target position acquiring unit. In this example, relative position information of the target is obtained by extracting the target from the image information acquired by the camera 13 and by calculating a relative distance or angle of the target.

An object extracting unit 61 extracts an object from the image information provided by the camera.

An image information template unit 62 stores in advance various kinds of image information as templates, where the image information serves as targets.

A matching processing unit 63 compares the object extracted by the object extracting unit 61 and the template of the target to be extracted from image information template unit 62, and determines an object having the highest similarity.

A position calculating unit 64 calculates the position information. For example, the position information can include the relative distance or direction angle value of the target from the position, or size of the target in the image information and camera parameter information, such as a prescribed angle of view or magnification of the camera.

The target position acquiring unit 36 successively continues to calculate the position information of the same object while the target movement control unit 35 traces the target.

Returning to the description of FIG. 3, the target movement control unit 35 obtains the position information of the target obtained from the target position acquiring unit 36, and constantly generates the movement path for moving to that position. On the basis of the constantly generated movement path, for example, the rotation speeds of the tires 8 or the like are successively supplied to the moving unit 4, and then the robot device is guided to the position of the target. The target movement control unit 35 performs a control loop for constantly detecting the latest target, constantly generating the movement path to that target, and constantly moving the robot device.

Figure 9:
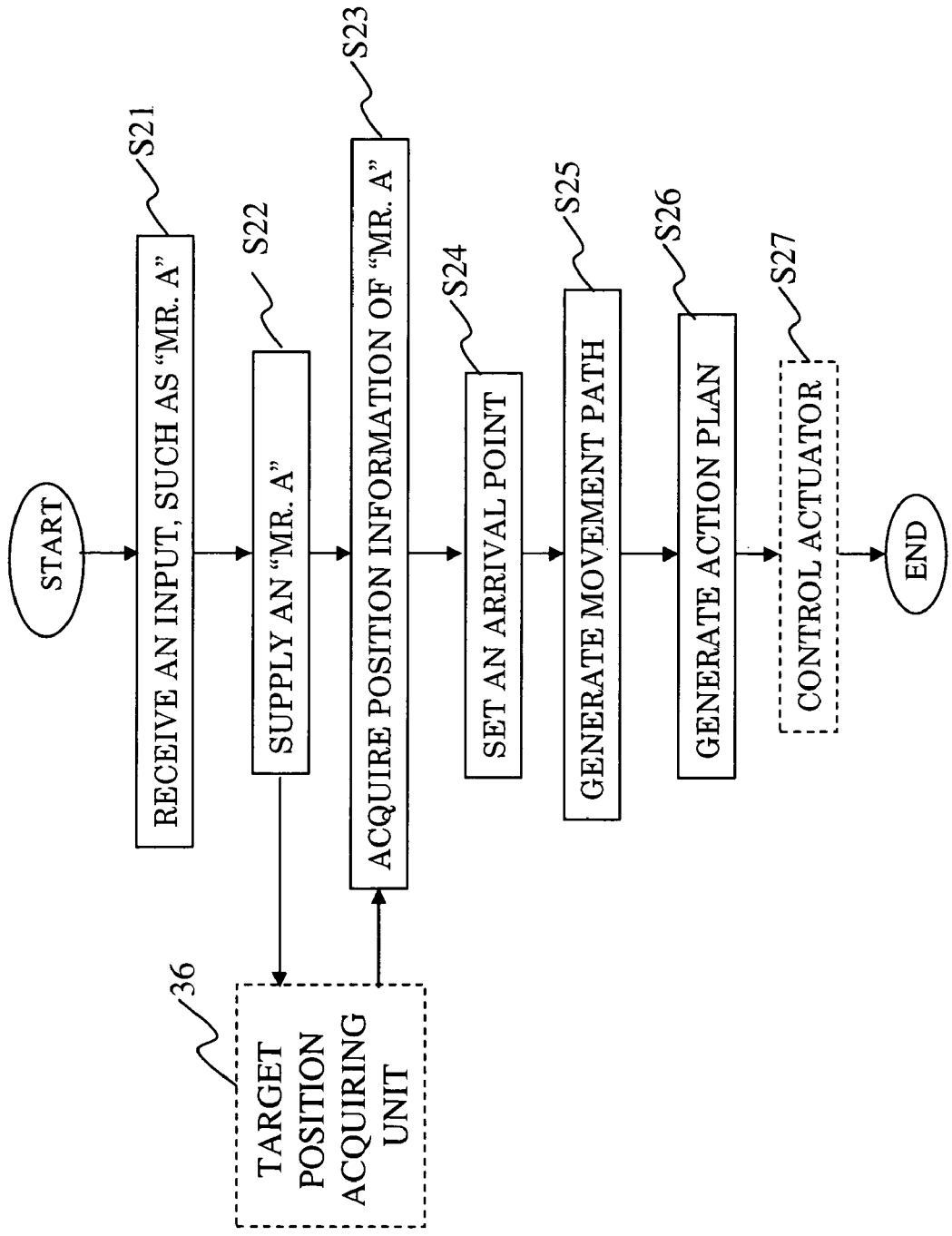
FIG. 9 is a flowchart illustrating a process for following a user according to target movement control unit.

FIG. 9 is a flowchart illustrating a process for following a user via target movement control unit. The target movement control unit 35 receives from the movement method judging/instructing unit 33 an input being a person, such as "MR. A," included in the task (S21). Then, the target movement control unit 35 supplies an information of "MR. A" by identifying the target to the target position acquiring unit 36 (S22). Subsequently, the target movement control unit 35 acquires the position information of "MR. A" from the target position acquiring unit 36, which calculates the position information of "MR. A", as described above (S23).

The target movement control unit 35 sets position information of a neighboring arrival point from that position information (S24). As for the setting of the arrival point, for example, the position of the target may be set as the position of the arrival point as it is. Further, when the action of "FOLLOW" is defined by "DISTANCE BETWEEN TARGET AND ROBOT DEVICE IS MAINTAINED CONSTANT", on a line segment connecting Mr. A and the robot device, a point spaced from Mr. A by a set value may be defined as the arrival point. Alternatively, the movement direction from the previous position information of Mr. A may be calculated, and an arrival point along the movement direction (that is, an arrival point to maintain "to be constantly positioned at a constant distance from Mr. A in motion") may be defined.

Next, the target movement control unit 35 generates a movement path having the current position information of the robot device, which is the internal information of the robot device, as a start point and position information of the set arrival point as an end point by use of the map information (S25). If the movement path is complex, division paths may be generated subsequently, as described above with respect to the position movement control unit 34.

Next, the target movement control unit 35 creates an action plan by generating a series of speed values or a series of acceleration values in the generated path, or division paths (S26). The creation of the action plan maybe performed through the same method as described above with respect to the position movement control unit 34.

The created action plan is transmitted to the moving unit 4, and the moving unit 4 controls the actuator on the basis of the transmitted action plan, like the method described above with respect to the position movement control unit 34 (S27).

Target movement control unit 35 acquires the position information of "MR. A" from the target position acquiring unit 36, which calculates the position information of "MR. A", during a series of processing operations, for example, for each predetermined period. If so, the current processing is interrupted, and steps S24 to S27 are repeated due to the new position information of "MR. A" and the position information of the robot device at that time, such that the robot device operates according to the latest movement path.

In the flowchart of the target movement control unit 35 described above, the position information is constantly calculated, but, alternatively, a method of controlling the direction and the relative distance of the target may also be used. In this case, if the speed is controlled such that the relative distance toward the target is not smaller than a prescribed threshold value, riskiness of collision on the target is avoided. Further, a calculation load can be reduced, and thus the latest movement path can be obtained at higher speed.

According to the present embodiment described above, the movement can be performed through the judgment of the instruction from the user and the appropriate movement control method. In particular, according to the instruction of the user, the position movement control and the target movement control can be appropriately selected.

Additional advantages and modification will now occur to those skilled in the art. Therefore, the invention in its broader aspect is not limited to the specific details and representative embodiments shown and described herein. Accordingly, various modifications may be made without departing from the spirit or scope of the general inventive concept as defined by the appended claims and their equivalents.

What is claimed is:

1. A robot device, which autonomously performs actions, comprising:
    a moving unit configured to move the robot device;
    a target position acquiring unit configured to acquire position information of a target;
    a first movement control unit configured to designate fixed position information as a destination and control the moving unit to move from current position information thereof to the fixed position information;
    a second movement control unit configured to designate the target as the destination, obtain the position information of the target from the target position information acquiring unit, and control the moving unit to move towards the obtained position information of the target;
    an instruction input unit configured to receive a user input indicating the destination;
    a storage unit configured to store map information for moving the robot device, the map information comprising a plurality of fixed positions; and
    a judging unit configured to:
        judge whether the fixed positions comprising the map information include the fixed position information of the destination indicated by the user input,
        provide the fixed position information as the destination to the first movement control unit when the fixed positions comprising the map information include the fixed position information of the destination indicated by the user input, and
        provide the target as the destination to the second movement control unit when the fixed positions comprising the map information do not include the fixed position information.

2. The robot device according to claim 1,
    wherein the first movement control unit generates a movement path from the current position information of the robot device to the fixed position information and controls the moving unit on the basis of the generated movement path, and
    the second movement control unit configured to generate and update a movement path from the current position information of the robot device towards the position information of the target when the position information of the target is obtained from the target position information acquiring unit, and control the movement of the robot device on the basis of the updated movement path.

3. The robot device according to claim 2, wherein the movement path is based on a fixed position on a map.

4. The robot device according to claim 2, wherein the movement path is based on a direction and a distance for the robot device.

5. The robot device according to claim 1, wherein the target position acquiring unit captures an image including the target designated by the second movement control unit by a camera and calculates the position information on the basis of the captured image.

6. The robot device according to claim 1, wherein, when the target designated by the second movement control unit generates audio, the target position information acquiring unit acquires audio-source information using an audio-source sensor for detecting the direction of the audio and calculates the position information of the target on the basis of the audio-source information.

7. The robot device according to claim 1, wherein, when the target designated by the second movement control unit has a directional wireless tag, the target position information acquiring unit determines the position information of the target from a direction and a wireless intensity of the tag.

8. The robot device according to claim 1, wherein the instruction input unit, in response to a voice command, determines an action for solving a recognition result obtained through voice recognition of the voice command, and inputs an instruction generated for implementing the action.

9. The robot device according to claim 1, wherein the instruction input unit, in response to a voice command from a user, determines an action for solving a recognition result obtained through voice recognition, selects the instruction for the movement from instructions generated for implementing the action, and inputs the selected instruction for the movement.

10. A method for controlling a robot device, comprising:
    receiving a user input indicating a destination for the robot device, the destination being a target or a fixed position;
    storing, in a storage device, map information for moving the robot device, the map information comprising fixed position information;
    judging whether the fixed position information comprising the map information includes fixed position information for the destination indicated by the user input;
    selecting the fixed position as the destination of the robot device when the fixed position information comprising the map information includes the fixed position information for the destination indicated by the user input;
    selecting the target as the destination of the robot device and acquiring position information of the target when the fixed position information comprising the map information does not include the fixed position information for the destination indicated by the user input; and moving the robot device to the selected destination.

11. A computer-readable medium comprising instructions for causing a processor to implement a method for controlling a robot device, the method comprising:

receiving a user input indicating a destination for the robot device, the destination being a target or a fixed position;

storing, in a storage device, map information for moving the robot device, the map information comprising fixed position information;

judging whether the fixed position information comprising the map information includes fixed position information for the destination indicated by the user input;

selecting the fixed position as the destination of the robot device when the fixed position information comprising the map information includes the fixed position information for the destination indicated by the user input;

selecting the target as the destination of the robot device and acquiring position information of the target when the fixed position information comprising the map information does not include the fixed position information for the destination indicated by the user input; and moving the robot device to the selected destination.

* * * * *